United States Patent [19]

Mamada et al.

[11] Patent Number: 5,242,491
[45] Date of Patent: Sep. 7, 1993

[54] PHOTO-INDUCED REVERSIBLE, DISCONTINUOUS VOLUME CHANGES IN GELS

[75] Inventors: Akira Mamada, Wakayama, Japan; Toyoichi Tanaka, Wellesley, Mass.; Dawan Kungwatchakun, Bangkok, Thailand; Masahiro Irie, Fukuoka, Japan

[73] Assignee: Massachusetts Institute of Technology, Cambridge, Mass.

[21] Appl. No.: 827,861

[22] Filed: Jan. 30, 1992

Related U.S. Application Data

[63] Continuation of Ser. No. 425,788, Oct. 23, 1989, abandoned.

[51] Int. Cl.⁵ .................... C08L 101/00; C08L 99/00; C08L 77/04
[52] U.S. Cl. ................................ 106/241; 252/315.1; 522/6; 522/65
[58] Field of Search ........................ 252/315.01, 315.1; 106/241; 522/6, 65

[56] References Cited

U.S. PATENT DOCUMENTS 4,732,930  5/1988  Tanaka ................................ 524/742

FOREIGN PATENT DOCUMENTS 61-055180  3/1986  Japan .

OTHER PUBLICATIONS

Irie et al., Macromolecules, 19: 2476-2480 (1986) (no month).
Tanaka, et al., Phys. Rev. Lett., 38(14): 771-774 (1977) (no month).
Tanaka, T., Phys. Rev. Lett., 40(12): 820-823 (1978) (no month).
Tanaka, T., Scientific American, 244(1): 124-138 (1981) (no month).
Tanaka, T., et al. Scattering Techniques... Systems, Ed. Chen, Chu & Nossal, Plenum Press, pp. 321-336 (1981) (no month).
Tanaka, T. et al., Phys. Rev. Lett., 45(20): 1636-1639 (1980) (no month).
CA 111 (18): 154825v, Hirotsu et al., 1988 (no month).
CA 107 (22): 200272e, Haruta et al., 1987 (no month).
CA 106 (16): 126542d, Horitsu, 1987 (no month).
CA 102 (10): 204683; Horikawa et al., 1985 (no month).
CA 78 (14): 91006f, Taylor, 1972 (no month).
CA 111 (18): 154825v, Hirotsu et al., 1988 (no month).
CA 107 (22): 200272e, Haruta et al., 1987 (no month).
CA 106 (16): 126542d, Hirotsu, 1987 (no month).
CA 102 (10): 204683, Horikawa et al., 1985 (no month).

Primary Examiner—David Brunsman
Attorney, Agent, or Firm—Hamilton, Brook, Smith, Reynolds

[57] ABSTRACT

Novel gel compositions are provided which exhibit a drastic discontinuous volume change when exposed to or shielded from light energy.

14 Claims, 1 Drawing Sheet

PHOTO-INDUCED REVERSIBLE, DISCONTINUOUS VOLUME CHANGES IN GELS

This is a continuation of co-pending application Ser. No. 07/425,788 filed on Oct. 23, 1989 now abandoned.

BACKGROUND OF THE INVENTION

This invention relates to novel gel compositions which are capable of discontinuous volume change of several hundred times induced by exposure to light.

Gel is a form of material between the liquid and the solid state. It consists of a crosslinked network of long polymer molecules with liquid molecules trapped within the network. Gels play important roles in various aspects of our everyday life.

In chemistry and biochemistry, gels are used extensively as matrices for chromatography and electrophoreses analytical methods that separate molecules according to their molecular weights and charges. In these techniques, the pore size of the crosslinked polymer network plays an essential role in its sieving effects.

Recently, with the help of light scattering spectroscopy, very interesting phenomena in permanently crosslinked gels have been found: as the temperature is lowered, the polymer network becomes increasingly compressible, and at a certain temperature, it becomes infinitely compressible. At the same time, the effective pore size of the network increases and diverges. It is also observed that the volume of gels changes reversibly by a factor as large as several hundred by an infinitesimal change in external conditions such as solvent composition or temperature. Tanaka, Physical Review Letters, Vol. 40, no.12, pp. 820-823, 1978 and Tanaka et al, Physical Review Letters, Vol. 38, No. 14, pp 771-774, 1977; Tanaka et al Physical Review Letters 5, Vol. 45, pg. 1636, 1980; Ilovsky, Macromolecules, Vol. 15, pg. 782, 1982; Hrouz et al, Europ. Polym. J., Vol. 17, pg. 361, 1981; Ohmine et al, J. Chem. Physics, Vol.8, pg. 6379, 1984; Tanaka et al, Science, Vol. 218, pg. 462, 1972 and Ilavsky et al, Polm, Bull, Vol. 7, pg. 107, 1982.

It is known that copolymers of acrylamide and sodium acrylate in gel form are capable of drastic volume change and it is also known that the gel showed continuous volume change when the concentration of the sodium component, which was an ionizable group, was smaller than the critical value, while the change became discontinuous when the concentration of the acrylic acid component was greater than the critical value.

According to the conventional knowledge as described above, in order to prepare a polymer gel having the phase transition function with large discontinuous volume change when the concentration of the sodium acrylate component was greater than the critical value.

According to the conventional knowledge as described above, in order to prepare a polymer gel having the phase transition function with discontinuous volume change, it was believed necessary that the polymer contained a considerably large amount of the ionizable group.

The volume change of the conventional gels having an ionic group described above significantly depends on hydrogen ion concentration (pH) of the liquid medium to be used. Therefore, the conventional ionic gel could not be used when pH of the liquid medium could not be controlled sufficiently.

It is also known that polymers containing no ionizable group formed from a monomer containing a predominant amount of a N-isopropylacrylamide and a crosslinking agent exhibit a drastic volume transition in water or mixtures of a solvent and water in response to change in liquid solvent composition. These gels do not depend upon hydrogen ion concentration of the liquid solvent.

It is disclosed in U.S. Pat. No. 4,732,930 that an ionic gel based upon N-isopropylacrylamide and an ion containing monomer which is capable of drastic volume in respond to changes of temperature, pH or ion composition.

Prior to this invention no gel have been known which are capable of drastic volume change in response to exposure to photons, e.g. visible or ultraviolet light. It would be desirable to provide such gel composition since photons provide a means for quickly changing the physical and/or chemical environments which promote a drastic volume change in the gel.

SUMMARY OF THE INVENTION

Figure 1:
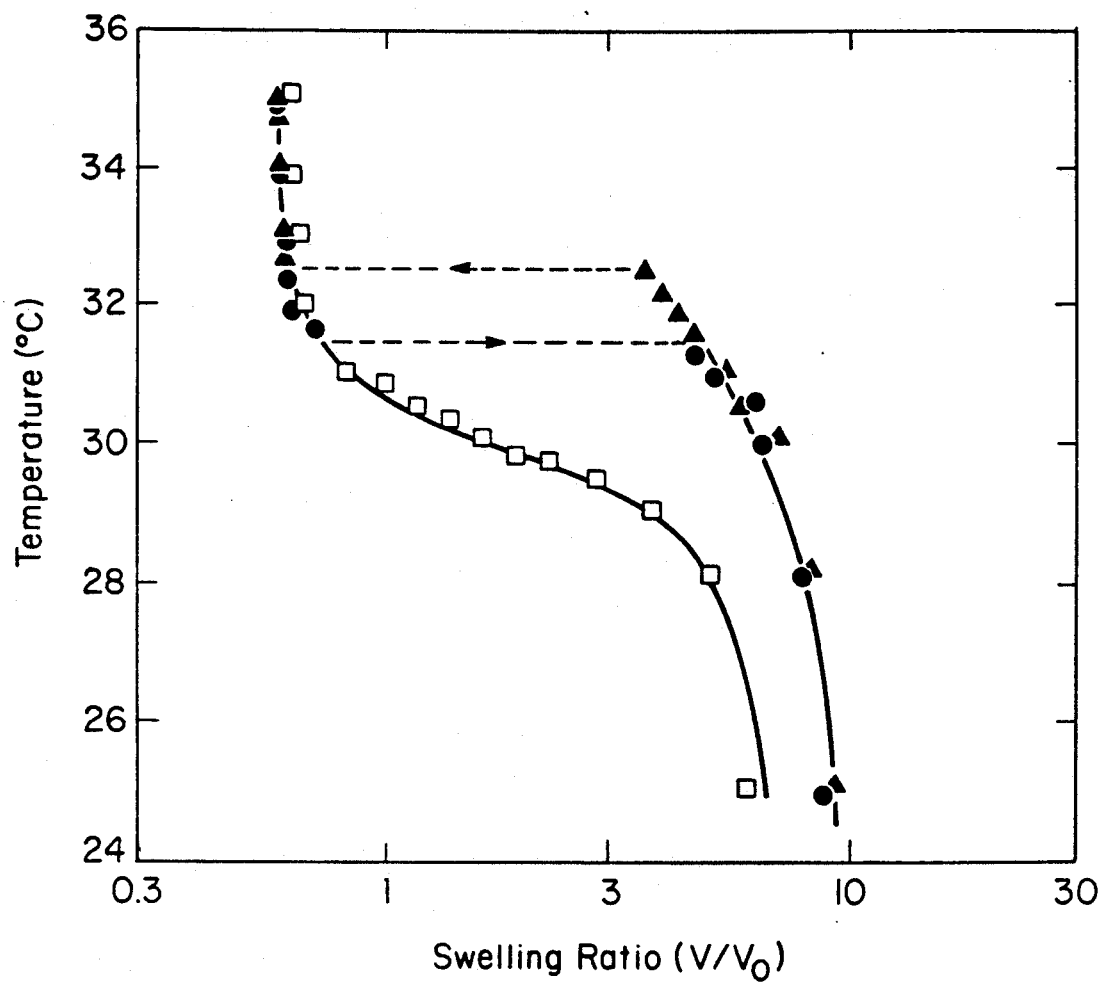
FIG. 1 shows swelling curves of gels in response to exposure to ultraviolet light as a function of temperature.

In accordance with this invention, gels including a component capable of increasing a length of a molecular chain of a gel component, a release of an ionic component or counter-ions in response to exposure to photon energy or of decreasing the length of a molecular chain, or the entrapment of an ionic component or counter-ions in response to isolation to photon energy exhibit the phase transition function with discontinuous volume change. The gel of this invention is composed of polymer and a photosensitive molecule together with a solvent composition which produces a gel having a critical concentration of the three components and which gel is capable of drastic volume change in response to exposure or isolation to photon energy. The polymeric product of this invention has such a reversible phase transition function that brings a drastic volume change in response to changes in photon energy.

The gels of this invention are capable of exhibiting a drastic volume change when characterized by a critical concentration of polymer composition and solvent which produces the gel and which responds to exposure to or shielding from a source of photon energy which includes the drastic volume change.

DESCRIPTION OF SPECIFIC EMBODIMENTS

In accordance with this invention, gel compositions are provided which have a critical composition and are at a temperature such that they exhibit a drastic volume change when exposed to or shielded from photon energy. The frequency of the photon energy or shielding from photon energy induces change in the molecular structure of the polymeric component of the gel which in turn induces the drastic volume change. Examples of such change in molecular structure are the folding or unfolding of the polymeric chains; the isomerization from the cis to trans form or from the trans to the cis form; or the formation of ionic species or the conversion of ionic species to a bound unitary molecular structure. In order for the gel to exhibit a drastic volume change in response to a condition of photon energy, the gel must have a concentration within a narrow critical concentration range and must be at a critical temperature within a narrow critical temperature range.

Examples of polymers which can be utilized to form the gel composition of this invention include polymers including ionizable moieties in the polymer chain which increase internal osmotic pressure within the gel when released as ions. Such ions can be any ions and include sodium, potassium, chloride, cyanide and hydroxide. Suitable polymers can be any water solube polymers since phase transition is found to be universal to any gels. Namely, they can be observed when a proper solvent composition and temperature are given. They include crosslinkable polyacrylamide derivatives such as polyisopropylacrylamide, and poly-N-isopropyacrylamide, polystyrene sulfonate, gels made of polysaccharides such as ionized agarose, polypeptides such as geleting, and polynucletides such as DNA and RNA. Examples of polymer chains which fold or unfold their microstructure in response to a condition of photon energy include polyacrylamide or poly-N-isopropylamide. Examples of polymers which are changed between a cis structure and a trans structure include polyacrylamide, poly-N-isopropylamide. Any polymer can perform in the same manner so long as the gel state is near the phase transition.

Representative crosslinking agents include N,N'-methylene-bis acrylamide, ethylene glycol dimethacrylate, glycerine triacrylate or divinylbenzene-1- or the like. The concentration of crosslinkable monomer is generally about 0.3 to 4 mole percent based upon the polymerizable monomer which is the main component. The crosslinking agent effects partial crosslinking of the polymer and provides a means to control the strength, swelling degree, phase transition temperature and the like of the gel by changing the crosslinking density.

A mixture of these monomers can be polymerized using a polymerization initiator, e.g., a free radical initiator such as ammonium persulfate or sodium metal bisulfite, etc., with dilution with a solvent, e.g., water, a lower alcohol, hydrocarbon, etc., or without dilution. However, neither the solvent nor the polymerization initiator are always important factors to obtain the polymerized product from the monomer mixture, and any method suitable selected from the conventionally well-known gelation methods may be applied. Crosslinking can also be introduced to polymers by ultraviolet or electron beam irradiation.

As the liquid component of the gel of this invention, any of a solvent which has the affinity with the above-mentioned polymerized product and is compatible with water, for example, dimethylsulfoxide, dimethylformamide, acetone, tetrahydrofuran, alcohol and the like, water, or a mixture of said solvent and water can be employed.

The kind, combination and composition ratio of these liquid mediums have an influence on the critical conditions for the reversible phase transition of the gel of this invention, e.g., temperature, etc., and the composition of the liquid medium can also be a critical condition in itself. Accordingly, suitable selection of the kind and composition of the liquid medium is required in accordance with the critical phase transition conditions desired for the gel. In any event, there exists a minimum critical concentration of ionic component within a gel for each solvent system employed in order to achieve reversible drastic volume change of the gel. This minimum ionic concentration can be determined for each polymer network and solvent system by the procedure set forth in the Examples.

The guideline for selection of a solvent in which the phase transition occurs is to choose one which has a temperature slightly lower than the desired phase transition temperature.

The gel of this invention is prepared by swelling the above-said polymerized product in the liquid medium. The polymerized product having a low crosslinking degree absorbs a large amount of the liquid medium to form a gel having a large degree of swelling. The gels of this invention thus prepared, however, never swell unlimitedly, but reach an equilibrium state in which the gel coexists with the excess liquid medium after swelling to its limit.

When the gel is in a swelled state, the liquid medium composition of the temperature of the gel can be changed to effect a drastic volume change of the gel. The gel thus prepared is in a state wherein drastic phase transition occurs when the composition of the liquid medium is changed to reach the critical composition, i.e., where the volume shrinks discontinuously by releasing the liquid medium. Alternatively, a reversal of the phase transition is effected at a different critical composition of the liquid medium where the gel volume swells discontinuously by releasing the liquid medium. Furthermore, when the temperature of the swelled gel is raised to exceed the critical temperature, the gel causes phase transition and releases the liquid medium, thereby shrinking the volume discontinuously. When the temperature drops below the critical temperature, the volume swells again discontinuously.

This invention will be described with reference to the following equations.

$$T_c = \Theta/(1 \pm 22.5\phi_o) \quad \text{(Equation 1)}$$

$$\pi = \pi_{rubber} + \pi_{affinity} + \pi_{ion} \quad \text{(Equation 2)}$$

$$\pi_{rubber} = \nu_o kT\{(\phi/2\phi_o) - (\phi/100_o)^{\frac{1}{3}}\} \quad \text{(Equation 3)}$$

$$\pi_{affinity} = \nu_o kT\{ln(1-\phi) + \phi\} + \Delta F(\phi/\phi_o)^2 \quad \text{(Equation 4)}$$

$$\pi_{ion} = \nu_o kT(\phi/\phi_o) \quad \text{(Equation 5)}$$

$$\chi = \Delta F/2kT = (\Delta H - T\Delta S)/2kT \quad \text{(Equation 6)}$$

$$1/T = \Delta S/\Delta H - 2k/\Delta H\{\nu_o\nu_o/\phi^2[(\phi/\phi_o)^{\frac{1}{3}} - (f+\tfrac{1}{2})(\phi/\phi_o)] + ln(1-\phi) + \phi + \phi^2/2\} \quad \text{(Equation 7)}$$

where $\nu_o$ is the molar volume of water.

Using the Equation 1, it is possible to determine the critical temperature (Tc) of the phase transition where $\theta$ is the theta temperature of the network in the solvent, and $\phi_o$ is the concentration of the polymer network at gelation. The sign in the denominator should be plus for gels which collapse at lower temperatures, and minus for gels which collapse at higher temperatures.

Once the critical temperature range has been determined, the particular level of photo energy required to effect a drastic volume change is determined as follows:

The gels as prepared are immersed in water in a tightly sealed vial around which temperature controlled water is circulated. Ultraviolet light from a medium pressure mercury lamp is used to illuminate the gel in the vial. After the gel reaches equilibrium, its diameter, d is measured using a microscope. From the diameter d the swelling ration $[d/d_o]^3$ is determined, where $d_o$ denotes the initial diameter of the gel. The photo energy can be supplied to the gel composition by a conventional light source means such as standard ultraviolet lamp or laser.

The gel of this invention capable of drastic volume change can be used as an element to convert thermal energy to mechanical energy, a sensor element, a memory element a photomechanical transducer and the like and, additionally, can be applied to various fields such as artificial organs, medical appliances, toys, as well as measuring instruments and switches.

The following example illustrates the present invention and is not intended to limit the same.

EXAMPLE I

An N-isopropylacrylamide/[Bis(4-dimethylaminophenyl)-4-vinylphenyl-methane-leucocyanide], copolymerized gel was prepared by a free radical copolymerization in dimethylsulfoxide (DMSO) at 60° C., under nitrogen atmosphere. The N-isopropylacrylamide, was purified by recrystallization from the mixture of petroleum ether and toluene, as a neutral, main constituent, (NIPA, 0.97 g), N,N'-Methylene-bisacrylamide, crosslinker, (BIS, 0.0003 g), [Bis(4-dimethylaminophenyl)-4-vinylphenyl-methane-leucocyanide], photo sensitive molecule (Leucoderivative and Azo-bis-isobutylonitrile, initiator, (AIBN, 0.05 g), were dissolved in DMSO, (1.0 g), and purified by distillation under nitrogen atmosphere. The solution was then transferred into a polyethylene tube, having a 1.73 mm inner diameter wherein a reaction was carried out at 60° C. for 4 hours. After the gelation was complete d, the 1.73 mm diameter gel was removed from the polyethylene tube, cut into 0.5 to 1 mm thick discs and then immersed in a large amount of deionized, distilled water to wash away residual chemicals and unreacted monomers from the polymer network. Water was repeatedly changed until the diameter of the gel reached an equilibrium value, which took approximately a week.

The diameter of the gel, d, was measured by a microscope with a calibrated scale. The swelling ratio of the gel, $V/V_o$, was calculated from the ratio of equilibrium gel diameter to the original diameter, $(d/d_o)$, where $d_o$ was 1.733 mm. The temperature was controlled within 0.04° C. by circulating water during the measurement without ultraviolet irradiation. A GATES MR-4(wavelength 254 nm) was used for ultraviolet irradiation, and during illumination the temperature was controlled by not only circulating water but also with a thermomodule.

Swelling curves of gel measured with and without ultraviolet irradiation are shown in the Figure. When a gel was not irradiated with ultraviolet light, the NIPA/-Leuco derivative copolymer gel underwent a continuous volume change at about 30.0° C. The triphenylmethane leuco derivatives could not produce an ionic state since, without ultraviolet irradiation the state of NIPA-Leuco derivative copolymerized gels was the same as the pure NIPA gel not containing ionic molecules at all, NIPA-Leuco derivative gels were shown a continuous volume change curve. In addition, the transition temperature becomes lower than that of the gel consisting of only the NIPA.

Upon ultraviolet irradiation, the color of the gels changed from pale green to dark green, and the volume change of the gels showed the discontinuous curve. That is, while irradiating the sample with ultraviolet light, the temperature was raised from 25° C. gradually. At 32.6° C., the volume of gels suddenly decreased by approximately ten times. In contrast, when the temperature was lowered from 35° C. by degrees, the gel became suddenly swollen as large as about ten times. There is a discontinuous volume transition between raising and lowering because of the hysteresis as to the change of the first phase transition. When the temperature was fixed at 31.0° C. and the gel was exposed to ultraviolet light irradiation, the volume of the gels increased about ten times.

Phase transition of gels can be derived from its equation of state that relates three characteristic state variables of the gel: volume (V) or equivalent density of the polymer network ($\phi$), temperature (T) plus solvent composition (or polymer-solvent interaction parameter, $\Delta F$), and the osmotic pressure ($\pi$). In equilibrium the osmotic pressure of a gel has to be zero $\pi=0$. There are three contributions to the osmotic pressure of a gel as shown in Equations 2, 3 and 4 which represent the three osmotic pressures. Here $V_o$ denotes the number of effective crosslinks of the network when it is in the random walk configuration whose density is denoted by $\phi_o$. This state is referred to as the reference state. The rubber elasticity, $\pi$ rubber, which originates from the configurational entropy of the polymer network, provides a restoring pressure back to the reference polymer network density. When a polymer network is expanded, a negative pressure is created in the network and it shrinks back. On the other hand, when it is contracted, the pressure acts to expand to the original reference state. It is noteworthy that rubber becomes zero at $\phi_o$. Secondly, the polymer-polymer and polymer-solvent interactions give rise to another osmotic pressure, $\pi_{affinity}$. In a poor solvent, the polymer network tends to shrink, whereas in a good solvent a gel tends to swell. The last factor is the osmotic pressure due to ionization of the polymer network, $\pi_{ion}$. The counter-ions within the gel create a gas-type pressure to expand the gel in proportion to the density of counter-ions as well as the absolute temperature, kT, where k is the Boltzmann constant.

These three osmotic pressures are competing with each other and the gel volume is equilibrated in a condition at which these three osmotic pressures balance at $\pi=0$. At high temperatures the gas-type pressure of the counter-ions dominates and the gel is swollen. On the other hand, at low temperatures, the polymer-polymer affinity becomes important and the gel is shrinks. There is a special condition at which the competing pressures become equal, at which the transition occurs. When the two pressures are large, as in the case of extensively ionized gels, the volume transition is drastic and discontinuous. With increase of ionization, the volume changes as the transition becomes large. The equations above quantitatively explain all of these aspects of the phase transition. [see T. Tanaka, D. J. Filmore, S-T.Sun, I. Nihio, G. A. Swilslow, and A. Shar, Phys. Rev. Letters, 45 1636 (1980)].

To calculate the temperature dependent swelling ratio, temperature dependence of X is taken explicity in to account as shown in Equation 6 where $\Delta F$ represents the difference in the free energy of a solvent molecule that is immersed in pure polymer compared with one that is surrounded entirely by molecules of the same kind, $\Delta H$ and $\Delta S$ are the corresponding enthalpy and entropy changes, respectively. Using Eqs. (2), (3) and (4), and equation relating the equilibrium concentration of a gel to temperature is as shown in Equation 7.

Among the parameters in Eq. (6), $\phi_o$ can be estimated fairly accurately from the experimental asymptotic value of $V/V_o$ toward high temperature, i.e., $\phi_o \approx 0.065 \sim 0.075$. Also, the maximum number of $\nu$ can be estimated from an amount of crosslinker used, i.e., $\nu$ max $\approx 1.0 \times 10^{22} 1^{-1}$. $\Delta H$ of IPA molecule can be estimated from the solubility parameter. The value of $\Delta H$ so estimated is $\Delta H_{est} \approx -1.6 \times 10^{-12}$ erg.

It is clear from Eq. (6) that the transition temperature is mainly determined by the ratio $\Delta S/\Delta H$, while the curvature of a swelling curve is mainly determined by $\Delta H$.

We claim:

1. A gel having a phase transition function characterized by a drastic volume change in response to a change of photon energy at a desired phase-transition condition to which the gel is exposed, the gel comprising a polymerized product, which changes its molecular structure in response to said change in photon energy, and which includes a polymerized monomer and a photosensitive component, and a liquid medium present in an amount sufficient to form a gel with the polymerized product.

2. The gel of claim 1 wherein said change in molecular structure comprises ionizable moieties which effect a change in osmotic pressure between their ionized state and their bound state.

3. The gel of claim 1 wherein said change in molecular structure comprises folding or unfolding the polymeric chains of said polymerized product.

4. The gel of claim 1 wherein the phase transition is reversible.

5. The gel of claim 4 wherein the polymerized product is a copolymer formed from the monomer and the photosensitive component.

6. The gel of claim 5 wherein the photosensitive component includes bis(4-dimethylaminophenyl)-4-vinylphenyl methane-leucocyanide.

7. The gel of claim 6 wherein the monomer includes N-isopropylacrylamide.

8. The gel of claim 1 wherein the polymerized product is a crosslinked polymer of said monomer having the photosensitive component disposed therein.

9. A gel having a phase-transition function characterized by a drastic volume change in response to a change of photon energy at a desired phase-transition condition to which the gel is exposed, the gel formed by a method comprising the steps of:
   a) forming a polymerized product including a polymerized monomer and a photosensitive component, which, when gelled and thereafter exposed to a desired phase-transition condition, will exhibit said phase transition in response to said change of photon energy; and
   b) gelling the polymerized product with a liquid medium to form said gel.

10. The gel of claim 9 wherein the phase-transition function is reversible.

11. The gel of claim 10 wherein the polymerized product is formed by copolymerizing the monomer and the photosensitive component.

12. The gel of claim 11 wherein the photosensitive component includes bis(4-dimethylaminophenyl)-4-vinylphenylmethane-leucocyanide.

13. The gel of claim 12 wherein the monomer includes N-isopropylacrylamide.

14. In a gel having a phase-transition function characterized by a drastic volume change in response to a stimulus at a desired phase-transition condition to which the gel is exposed:

The improvement comprising a photosensitive component disposed within the gel in an amount sufficient to cause the gel to exhibit said drastic volume change in response to a change in photon energy to which the gel is exposed at said desired phase-transition condition.

* * * * *